US012776286B2

(12) United States Patent
Kim

(10) Patent No.: US 12,776,286 B2
(45) Date of Patent: Oct. 27, 2026

(54) METHOD AND APPARATUS FOR LED CONTROL TO ENHANCE VISIBILITY OF LCD DISPLAY

(71) Applicants: HYUNDAI MOTOR COMPANY, Seoul (KR); KIA CORPORATION, Seoul (KR)

(72) Inventor: Hyeo Jin Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/236,314

(22) Filed: Jun. 12, 2025

(65) Prior Publication Data

US 2026/0155110 A1 Jun. 4, 2026

(30) Foreign Application Priority Data

Dec. 3, 2024 (KR) ........................ 10-2024-0177482

(51) Int. Cl.
*G09G 3/34* (2006.01)

(52) U.S. Cl.
CPC ... *G09G 3/3426* (2013.01); *G09G 2320/0233* (2013.01); *G09G 2320/0626* (2013.01)

(58) Field of Classification Search
CPC ......... G09G 2320/0626; G09G 3/3426; G09G 2320/0233
See application file for complete search history.

(56) References Cited

U.S. PATENT DOCUMENTS

| | | | | |
|---|---|---|---|---|
| 2016/0338181 | A1* | 11/2016 | Schuch | H05B 47/16 |
| 2017/0256236 | A1* | 9/2017 | Shiho | G06F 1/3265 |
| 2018/0012565 | A1* | 1/2018 | Dunn | G09G 3/3406 |
| 2019/0088193 | A1* | 3/2019 | Tada | G06F 3/04845 |

* cited by examiner

*Primary Examiner* — Muhammad N Edun
(74) *Attorney, Agent, or Firm* — MCDONNELL BOEHNEN HULBERT & BERGHOFF LLP

(57) ABSTRACT

A method and apparatus for LED control enhances visibility of an LCD display. A method for controlling a backlight unit including one or more LEDs to optimize visibility of an LCD display includes obtaining illuminance information, sunrise information, and sunset information, determining one or more areas of the backlight unit divided into a plurality of areas having a predetermined size as a driving area, based on the illuminance information, sunrise information, and sunset information, and controlling the backlight unit based on the driving area.

18 Claims, 9 Drawing Sheets

METHOD AND APPARATUS FOR LED CONTROL TO ENHANCE VISIBILITY OF LCD DISPLAY

CROSS REFERENCE TO RELATED APPLICATIONS

The present application claims priority to Korean Patent Application No. 10-2024-0177482, filed on Dec. 3, 2024 in the Korea Intellectual Property Office, the entire contents of which are incorporated herein by reference.

TECHNICAL FIELD

The present disclosure relates to a method and apparatus for controlling an LED to optimize the visibility of an LCD display.

BACKGROUND

The statements in this section merely provide background information related to the present disclosure and do not necessarily constitute prior art.

Local dimming technology is used as a control method for a Direct BLU (Back Light Unit) type LCD (Liquid Crystal Display). The local dimming technology is a technology that divides the backlight unit (BLU), which includes a light emitting diode (LED) array, into multiple zones and controls each zone to be individually turned on or off. This technology has the advantage of increasing energy efficiency and achieving a certain level of contrast ratio by adjusting the brightness of a specific zone. However, since it is controlled by zone rather than pixel, it has limitations in terms of display visibility.

For example, when displaying an image of a certain size on the display, if only the zone containing the image is illuminated while the remaining zones are kept dark, the overall brightness may decrease, leading to reduced visibility. To solve this problem, increasing the current flowing through the backlight unit (BLU) to enhance the overall display brightness may cause the halo effect, causing unnecessary areas around the image to become brighter, which may result in deterioration in image quality.

Therefore, in the local dimming technology of the Direct BLU-type LCD display, a method and apparatus are needed to optimize visibility while maintaining image quality.

SUMMARY

An object of the present disclosure is to provide a method and apparatus for controlling an LED to enhance the visibility of an LCD display in various illuminance environments. Specifically, the present disclosure provides a method and apparatus for controlling an LED to optimize the visibility of an LCD display according to the environment, by determining a driving area based on illuminance information, sunrise information, and sunset information and controlling a backlight unit based on the driving area.

The technical objects of the present disclosure are not limited to those described above, and other technical objects not mentioned above may be understood clearly by those skilled in the art from the descriptions given below.

An embodiment of the present disclosure provides a method for controlling a backlight unit including one or more LEDs to optimize visibility of an LCD display, the method comprising obtaining illuminance information, sunrise information, and sunset information, determining one or more areas of the backlight unit divided into a plurality of areas having a predetermined size as a driving area, based on the illuminance information, sunrise information, and sunset information, and controlling the backlight unit based on the driving area.

Another embodiment of the present disclosure provides an apparatus for controlling a backlight unit including one or more LEDs to optimize visibility of an LCD display, the apparatus comprising: at least one memory storing commands, and at least one processor, wherein the at least one processor executes the commands to perform steps of obtaining illuminance information, sunrise information, and sunset information, determining one or more areas of the backlight unit divided into a plurality of areas having a predetermined size as a driving area, based on the illuminance information, sunrise information, and sunset information; and controlling the backlight unit based on the driving area.

According to an embodiment of the present disclosure, an appropriate mode among first to fourth modes can be determined based on illuminance information, sunrise information, and sunset information, and a backlight unit can be controlled based on a driving area that is set based on the determined mode, thereby optimizing visibility.

According to the present disclosure, an appropriate mode among first to fourth modes can be determined based on illuminance information, sunrise information, and sunset information, and a backlight unit can be controlled based on a driving area that is set based on the determined mode, thereby minimizing the halo effect.

According to the present disclosure, visibility can be optimized by adjusting a driving area based on an expected luminance.

The technical effects of the present disclosure are not limited to the technical effects described above, and other technical effects not mentioned herein may be understood to those skilled in the art to which the present disclosure belongs from the description below.

DETAILED DESCRIPTION

Figure 1:
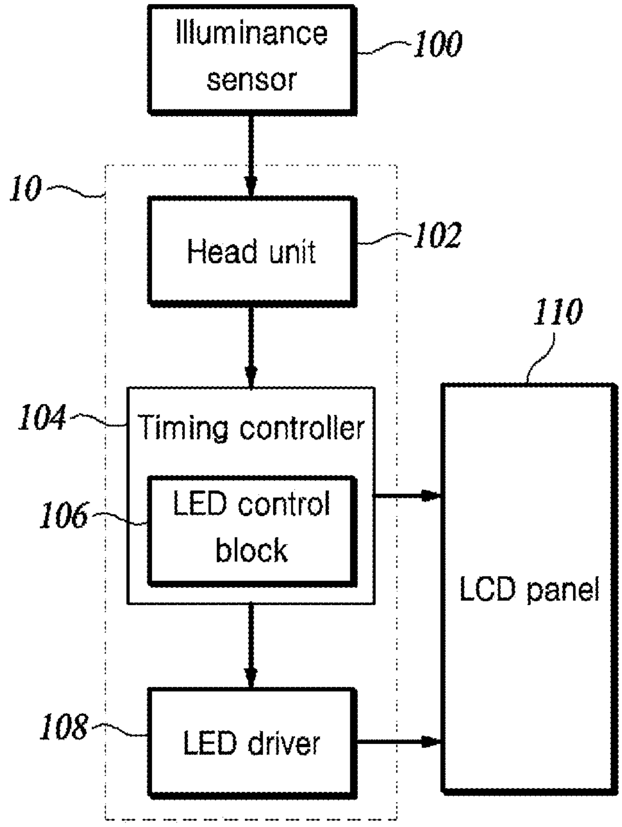
FIG. 1 is a block diagram schematically showing the configuration of an LED control device and a peripheral device thereof for optimizing the visibility of an LCD display according to an embodiment of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present invention, and is not intended to represent the only embodiments in which the present invention may be practiced.

FIG. 1 is a block diagram schematically showing the configuration of an LED control device and a peripheral device thereof for optimizing the visibility of an LCD display according to an embodiment of the present disclosure.

Referring to FIG. 1, an LED control device 10, an illuminance sensor 100, and an LCD panel 110 are illustrated.

The illuminance sensor 100 may detect the illuminance, i.e. brightness, of the external environment of a vehicle. The illuminance sensor 100 may convert the detected illuminance into a digital signal. The illuminance sensor 100 may transmit the converted digital signal to a head unit 102.

The LED control device 10 may include a head unit 102, a timing controller 104, an LED control block 106, and an LED driver 108. The LED control device 10 may be implemented using one or more computing devices 50. The LED control device 10 may include at least one memory 500 and at least one processor 520.

The head unit 102 may receive illuminance that is converted from the illuminance sensor 100 into a digital signal. That is, the head unit 102 may acquire illuminance information. The head unit 102 may obtain sunrise information and sunset information. The sunrise information and sunset information head unit 102 may be generated by the head unit 102 itself or may be obtained from an external source by the head unit 102. As one example, the head unit 102 may calculate sunrise and sunset times based on the vehicle's position, date, and time information. The vehicle's position may be obtained using a Global Positioning System (GPS). As another example, the head unit 102 may obtain sunrise and sunset times from a server. The head unit 102 may transmit the illuminance information, sunrise information, and sunset information to the timing controller 104.

The head unit 102 may acquire video data. The video data may be a source that includes at least one of information to be displayed on the LCD panel 110, such as navigation maps, rearview camera footage, entertainment content, and instrument panel information. The head unit 102 may be coupled to a server. The head unit 102 may transmit video data to the timing controller 104.

The timing controller 104 may receive the illuminance information, sunrise information, and sunset information from the head unit 102. The timing controller 104 may include the LED control block 106. The LED control block 106 may determine a driving area based on the illuminance information, sunrise information, and sunset information. The driving area may be determined based on any one of the first mode, second mode, third mode, and fourth mode. The LED control block 106 may select one of the first mode, the second mode, the third mode, and the fourth mode based on the external environmental conditions of the vehicle (e.g., illuminance information, sunrise information, sunset information). The method for determining the first to fourth modes and the shape of the driving area determined based on the first to fourth modes will be described in detail below with reference to FIGS. 2A to 2D. The LED control block 106 may calculate the expected luminance of the area including the target image based on the determined driving area. The method for calculating the expected luminance will be described in detail below with reference to FIGS. 3A and 3B. Optionally, the LED control block 106 may adjust the driving area based on the expected luminance. The timing controller 104 may transmit the position and brightness information of the driving area determined by the LED control block 106 to the LED driver 108.

The timing controller 104 may calculate the gate timing required for driving a pixel of the LCD panel 110. The timing controller 104 may transmit a gate timing signal to the LCD panel 110.

The timing controller 104 may receive video data from the head unit 102. The timing controller 104 may transmit the video data to the LCD panel 110. The timing controller 104 may transmit video data in conjunction with the gate timing signal.

The LED driver 108 may receive the position and brightness information of the driving area from the timing controller 104. The LED driver 108 may control the backlight unit of the LCD panel 110 based on the position and brightness information of the driving area.

The LCD panel 110 may include the backlight unit, a polarizing filter, a glass substrate, a color filter, and a TFT array. The LCD panel 110 may display an image using light generated from the backlight unit. The backlight unit may include a plurality of LEDs. The backlight unit may be divided into a plurality of areas each having a predetermined size.

The LCD panel 110 may receive the gate timing signal from the timing controller 104. The LCD panel 110 may receive the video data from the timing controller 104. The LCD panel 110 may display the video data. The LCD panel 110 may implement a desired image by adjusting the brightness and color of the pixel based on the gate timing signal and control of the LED driver 108. For example, the LCD panel 110 may apply voltage to each pixel at an accurate time based on the gate timing signal. For example, the LCD panel 110 may set the driving area to a given brightness by controlling the LED driver 108.

Figure 2A:
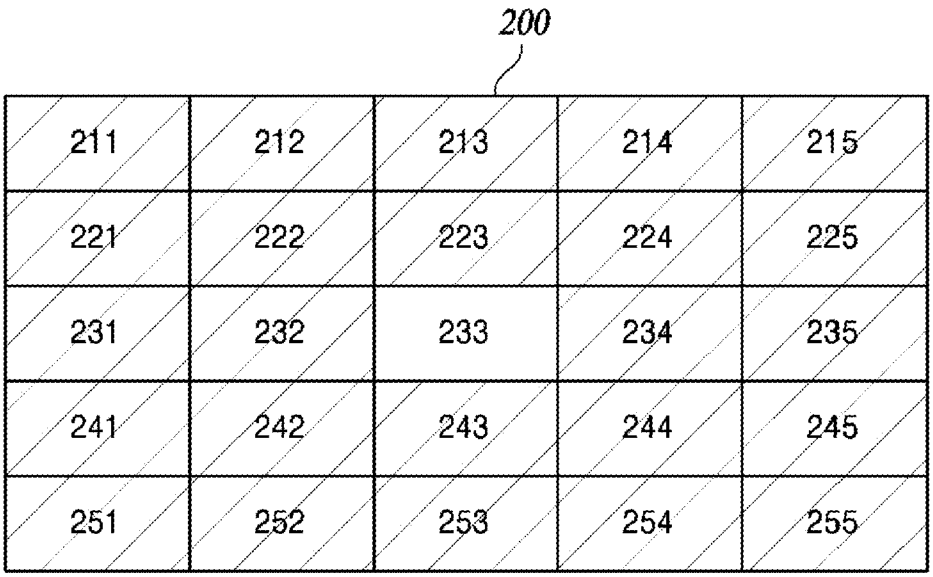
FIG. 2A is a diagram illustrating a backlight unit of a first mode according to an embodiment of the present disclosure.

FIG. 2A is a diagram illustrating the backlight unit of the first mode according to an embodiment of the present disclosure.

Referring to FIG. 2A, the backlight unit 200 is illustrated. The backlight unit 200 may be divided into a plurality of areas 211, 212, 213, 214, 215, 221, 222, 223, 224, 225, 231, 232, 233, 234, 235, 241, 242, 243, 244, 245, 251, 252, 253, 254, and 255 each having a predetermined size.

The first mode may be a mode that sets the area 233 including the target image as the driving area. The LED control block 106 may select the first mode when it is after sunset and before sunrise. The time after sunset and before sunrise may refer to nighttime.

The LED control block 106 may select the first mode when it is after sunrise and before sunset and the illuminance is less than a first threshold value based on the illuminance information. The illuminance less than the first threshold may mean that the vehicle is in a tunnel or underground parking lot. The first threshold value may be 400 lx. For example, the LED control block 106 may select the first mode when it is after sunrise and before sunset and the illuminance is less than 400 lx.

Figure 2B:
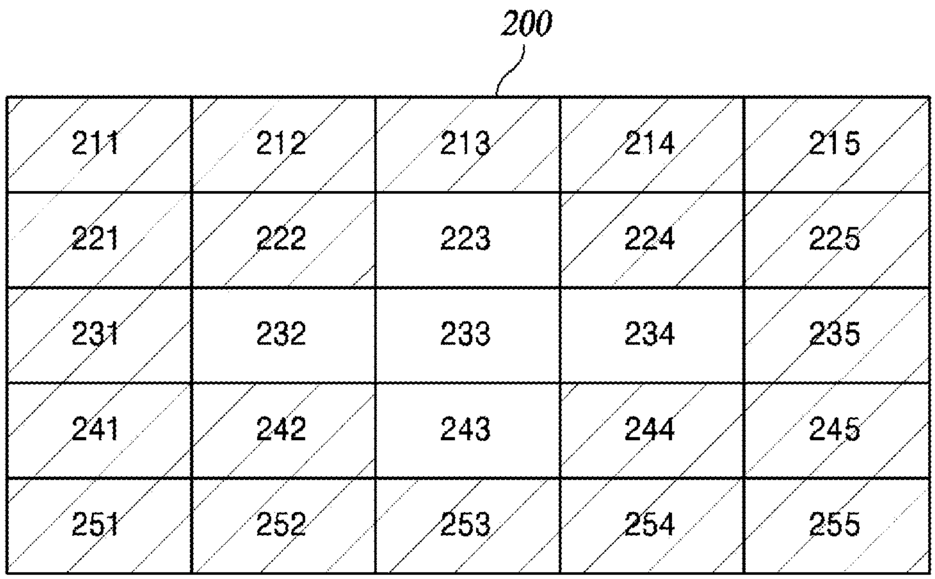
FIG. 2B is a diagram illustrating a backlight unit of a second mode according to an embodiment of the present disclosure.

FIG. 2B is a diagram illustrating the backlight unit of the second mode according to an embodiment of the present disclosure.

Referring to FIG. 2B, the backlight unit 200 is illustrated. The backlight unit 200 may be divided into a plurality of areas 211, 212, 213, 214, 215, 221, 222, 223, 224, 225, 231, 232, 233, 234, 235, 241, 242, 243, 244, 245, 251, 252, 253, 254, and 255 each having a predetermined size.

The second mode may be a mode that sets the area 233 including the target image and four areas 223, 232, 234, and 243 adjacent to the upper, lower, left, and right sides of the area including the target image as the driving area. The LED control block 106 may select the second mode when it is after sunrise and before sunset and the illuminance is equal to or greater than the first threshold value and less than a second threshold value based on the illuminance information. A case where the illuminance is equal to or greater than the first threshold value and less than the second threshold value may indicate a rainy day, morning, or early evening. The first threshold value may be 400 lx. The second threshold value may be 3000 lx. For example, the LED control block 106 may select the second mode when it is after sunrise and before sunset and the illuminance is equal to or greater than 400 lx and less than 3000 lx.

Figure 2C:
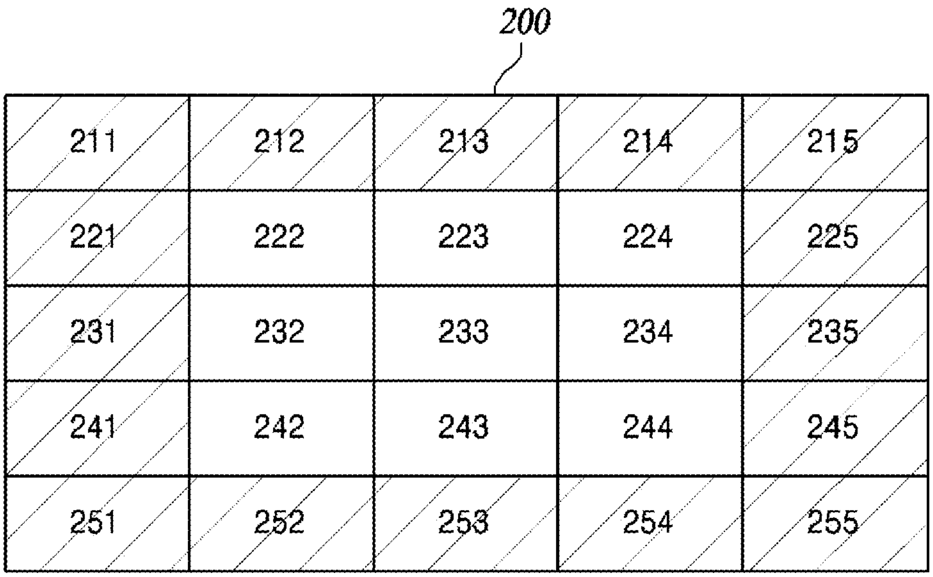
FIG. 2C is a diagram illustrating a backlight unit of a third mode according to an embodiment of the present disclosure.

FIG. 2C is a diagram illustrating the backlight unit of the third mode according to an embodiment of the present disclosure.

Referring to FIG. 2C, the backlight unit 200 is illustrated. The backlight unit 200 may be divided into a plurality of areas 211, 212, 213, 214, 215, 221, 222, 223, 224, 225, 231, 232, 233, 234, 235, 241, 242, 243, 244, 245, 251, 252, 253, 254, and 255 each having a predetermined size.

The third mode may be a mode that sets the area 233 including the target image, four areas 223, 232, 234, and 243 adjacent to the upper, lower, left, and right sides of the area including the target image, and four areas 222, 224, 242, and 244 diagonally adjacent to the area including the target image as the driving area. The LED control block 106 may select the third mode when it is after sunrise and before sunset and the illuminance is equal to or greater than the second threshold value and less than a third threshold value based on the illuminance information. A case where the illuminance is equal to or greater than the second threshold value and less than the third threshold value may indicate a clear day. The second threshold value may be 3000 lx. The third threshold value may be 10,000 lx. For example, the LED control block 106 may select the third mode when it is after sunrise and before sunset and the illuminance is equal to or greater than 3000 lx and less than 10,000 lx.

Figure 2D:
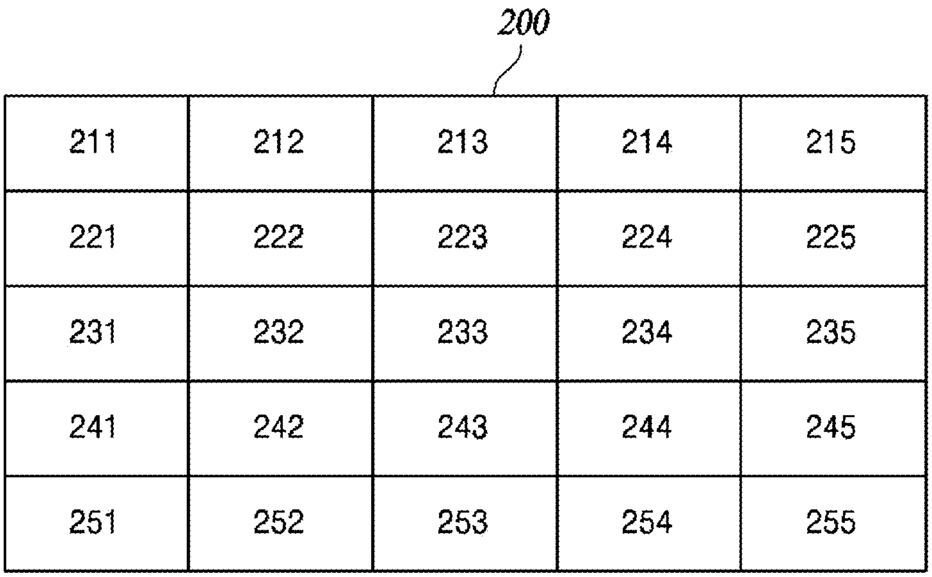
FIG. 2D is a diagram illustrating a backlight unit of a fourth mode according to an embodiment of the present disclosure.

FIG. 2D is a diagram illustrating the backlight unit of the fourth mode according to an embodiment of the present disclosure.

Referring to FIG. 2D, the backlight unit 200 is illustrated. The backlight unit 200 may be divided into a plurality of areas 211, 212, 213, 214, 215, 221, 222, 223, 224, 225, 231, 232, 233, 234, 235, 241, 242, 243, 244, 245, 251, 252, 253, 254, and 255 each having a predetermined size.

The fourth mode may be a mode that sets all of the plurality of areas 211, 212, 213, 214, 215, 221, 222, 223, 224, 225, 231, 232, 233, 234, 235, 241, 242, 243, 244, 245, 251, 252, 253, 254, and 255 as the driving area. The LED control block 106 may select the fourth mode when it is after sunrise and before sunset and the illuminance is equal to or greater than the third threshold value based on the illuminance information. A case where the illuminance is equal to or greater than the third threshold value may mean that the display, i.e. the LCD panel 110, is facing the sun directly, for example, a sunroof is open. The third threshold value may be 10,000 lx. For example, the LED control block 106 may select the fourth mode when it is after sunrise and before sunset and the illuminance is equal to or greater than 10,000 lx.

According to the present disclosure, an appropriate mode among the first to fourth modes can be determined based on the illuminance information, the sunrise information, and the sunset information, and the backlight unit can be controlled based on the driving area that is set based on the determined mode, thereby optimizing visibility.

According to the present disclosure, an appropriate mode among the first to fourth modes can be determined based on the illuminance information, the sunrise information, and the sunset information, and the backlight unit can be controlled based on the driving area that is set based on the determined mode, thereby minimizing the halo effect.

Figure 3A:
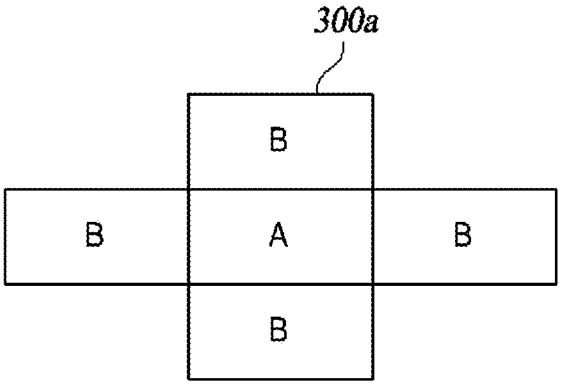
FIG. 3A is a diagram for explaining a method of calculating an expected luminance of an area including a target image in the second mode according to an embodiment of the present disclosure.

FIG. 3A is a diagram for explaining a method of calculating the expected luminance of the area including the target image in the second mode according to an embodiment of the present disclosure.

Referring to FIG. 3A, a driving area 300*a* of the second mode is illustrated. The driving area 300*a* may include an area A containing the target image and four areas B adjacent to the upper, lower, left, and right sides of the area containing the target image. Each of the four adjacent areas B may be expressed as an adjacent area B below.

The LED control block 106 may calculate the expected luminance of the area A including the target image based on Equation 1.

$$A' = A + B * \text{weight} * n \quad \text{Equation 1}$$

Referring to Equation 1, A' is the expected luminance, A is the base luminance of the area A containing the target image assuming that there is no adjacent area B, B is the base luminance of the adjacent area B, weight is the weight indicating the influence of the brightness of the adjacent area on the area containing the target image, and n is the number of adjacent areas.

For example, in Equation 1, if A is 500 nit, B is 500 nit, weight is 0.2, and n is 4 as shown in FIG. 3A, the expected luminance A' may be calculated as 900 nit. The weight value may vary based on the design of the backlight unit.

Figure 3B:
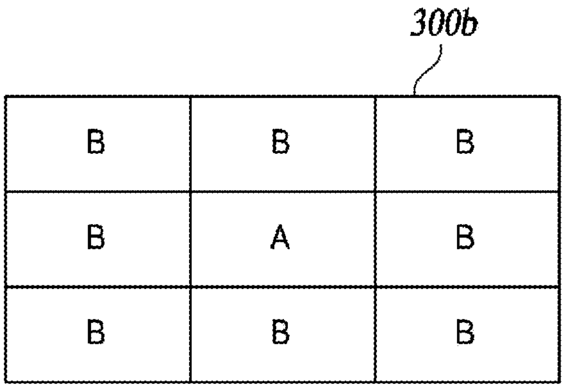
FIG. 3B is a diagram for explaining a method of calculating an expected luminance of an area including the target image in the third mode according to an embodiment of the present disclosure.

FIG. 3B is a diagram for explaining a method of calculating the expected luminance of the area including the target image in the third mode according to an embodiment of the present disclosure.

Referring to FIG. 3B, a driving area 300*b* of the third mode is illustrated. The driving area 300*b* may include an area A containing the target image and eight areas B adjacent to the area containing the target image in upper, lower, left, right, and diagonal directions. Each of the eight adjacent areas B may be expressed as an adjacent area B below.

The LED control block 106 may calculate the expected luminance of the area A including the target image based on Equation 1.

For example, in Equation 1, if A is 500 nit, B is 500 nit, weight is 0.2, and n is 8 as shown in FIG. 3B, the expected luminance A' may be calculated as 1300 nit. The weight value may vary based on the design of the backlight unit.

Optionally, the LED control block 106 may adjust the driving area based on the expected luminance. The LED control block 106 may obtain a difference between the expected luminance and the target luminance, and exclude one or more areas among the adjacent areas B from the driving area based on the difference. That is, based on the difference, voltage may not be applied to one or more areas among the adjacent areas B. For example, since the LED control block 106 needs to reduce the expected luminance A' by 100 nit when the target luminance is 1200 nit, one of the eight areas B may be excluded from the driving area.

According to the present disclosure, visibility can be optimized by adjusting the driving area based on the expected luminance.

Figure 4:
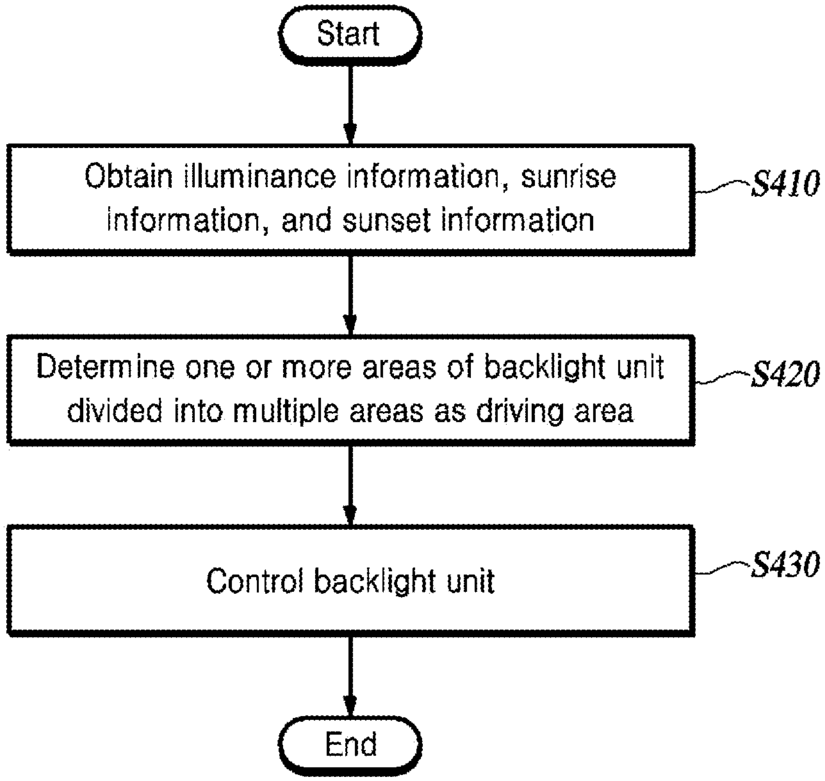
FIG. 4 is a flowchart schematically showing an LED control method for optimizing the visibility of an LCD display according to an embodiment of the present disclosure.

FIG. 4 is a flowchart schematically showing an LED control method for optimizing the visibility of an LCD display according to an embodiment of the present disclosure.

Referring to FIG. 4, the LED control device 10 may obtain illuminance information, sunrise information, and sunset information (S410).

The LED control device 10 may determine one or more areas among the backlight units divided into a plurality of areas having a predetermined size as a driving area, based on illuminance information, sunrise information, and sunset information (S420). The driving area may be determined based on any one of the first mode, the second mode, the third mode, and the fourth mode.

The LED control device 10 may control the backlight unit based on the driving area (S430).

Figure 5:
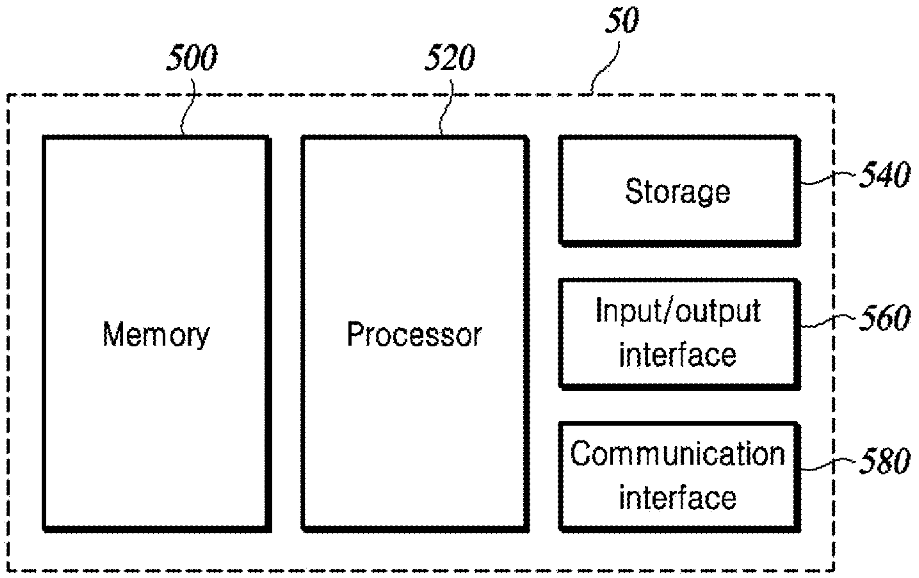
FIG. 5 is a block diagram illustrating an exemplary computing device that may be used for implementing a method or an apparatus according to the present disclosure.

FIG. 5 is a block diagram illustrating an exemplary computing device that may be used for implementing a method or an apparatus according to the present disclosure.

The computing device 50 may include all or part of a memory 500, a processor 520, a storage 540, an input/output interface 560, and a communication interface 580. The computing device 50 may be a stationary computing device, such as a desktop computer or a server, or a mobile computing device, such as a laptop computer or a smart phone. The computing device 50 may include a specialized hardware accelerator capable of processing operations of an artificial intelligence model in an efficient manner. For example, the computing device 50 may include a graphic processing unit (GPU), a tensor processing unit (TPU), or a neural processing unit (NPU).

The memory 500 may store a program that enables the processor 520 to perform methods or operations according to various embodiments of the present disclosure. For example, a program may include a plurality of instructions executable by the processor 520, and the methods or operations described above may be performed by executing the plurality of instructions by the processor 520. The memory 500 may consist of a single memory or a plurality of memories. In this case, information required to perform the methods or operation according to various embodiments of the present disclosure may be stored in a single memory or distributed across a plurality of memories. When the memory 500 is composed of a plurality of memories, the plurality of memories may be physically separated. The memory 500 may include at least one of volatile memory and non-volatile memory. Volatile memory includes Static Random Access Memory (SRAM) or Dynamic Random Access Memory (DRAM), while non-volatile memory includes flash memory.

The processor 520 may include at least one core capable of executing at least one instruction. The processor 520 may execute instructions stored in the memory 500. The processor 520 may consist of a single processor or a plurality of processors.

The storage 540 maintains stored data even if power supplied to the computing device 50 is cut off. For example, the storage 540 may include non-volatile memory or may include a storage medium such as a magnetic tape, an optical disk, or a magnetic disk. A program stored in the storage 540 may be loaded into the memory 500 before being executed by the processor 520. The storage 540 may store files written in a program language, and a program created from the files by a compiler may be loaded into the memory 500. The storage 540 may store data to be processed by the processor 520 and/or data processed by the processor 520.

The input/output interface 560 may provide an interface with an input device such as a keyboard or a mouse and/or an output device such as a display device or a printer. The user may trigger execution of a program by the processor 520 through the input device and/or check the processing results of the processor 520 through the output device.

The communication interface 580 may provide access to an external network. The computing device 50 may communicate with other devices through the communication interface 580.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although embodiments of the present disclosure have been described for illustrative purposes, those skilled in the art will appreciate that various modifications, additions, and substitutions are possible, without departing from the idea and scope of the claimed invention. Therefore, embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

The invention claimed is:

1. A method for controlling a backlight unit including one or more LEDs to optimize visibility of an LCD display, the method comprising:

obtaining, from a processor, illuminance information, sunrise information, and sunset information;

determining, by the processor, one or more areas of the backlight unit divided into a plurality of areas having a predetermined size as a driving area, based on the illuminance information, sunrise information, and sunset information; and controlling the backlight unit based on the driving area, wherein the driving area is determined based on any one of a first mode, a second mode, a third mode, and a fourth mode; and the first mode, the second mode, the third mode, and the fourth mode are determined based on external environmental conditions of a vehicle including the LCD display.

2. The method of claim 1, wherein the first mode is selected after sunset and before sunrise.

3. The method of claim 1, wherein the first mode is selected after sunrise and before sunset, and an illuminance is less than a first threshold value based on the illuminance information.

4. The method of claim 1, wherein the second mode is selected after sunrise and before sunset and an illuminance is equal to or greater than a first threshold value and less than a second threshold value, based on the illuminance information.

5. The method of claim 1, wherein the third mode is selected after sunrise and before sunset, and an illuminance is equal to or greater than a second threshold value and less than a third threshold value, based on the illuminance information.

6. The method of claim 1, wherein the fourth mode is selected after sunrise and before sunset, and an illuminance is equal to or greater than a third threshold value, based on the illuminance information.

7. The method of claim 1, wherein the first mode is a mode in which an area including a target image among the plurality of areas is set as the driving area.

8. The method of claim 1, wherein the second mode is a mode that sets, among the plurality of areas, an area including the target image and four areas adjacent to upper, lower, left, and right sides of the area including the target image as the driving area.

9. The method of claim 1, wherein the third mode is a mode that sets, among the plurality of areas, an area including the target image, four areas adjacent to upper, lower, left, and right sides of the area including the target image, and four areas diagonally adjacent to the area including the target image as the driving area.

10. The method of claim 1, wherein the fourth mode is a mode in which all of the plurality of areas are set as the driving area.

11. An apparatus for controlling a backlight unit including one or more LEDs to optimize visibility of an LCD display, the apparatus comprising:

a memory storing computer-executable instructions; and at least one processor configured to access the memory and execute the instructions, wherein the instructions comprise:

obtaining illuminance information, sunrise information, and sunset information;

determining one or more areas of the backlight unit divided into a plurality of areas having a predetermined size as a driving area, based on the illuminance information, sunrise information, and sunset information; and controlling the backlight unit based on the driving area, wherein the driving area is determined based on any one of a first mode, a second mode, a third mode, and a fourth mode; and the first mode, the second mode, the third mode, and the fourth mode are determined based on external environmental conditions of a vehicle including the LCD display.

12. The apparatus of claim 11, wherein the first mode is a mode in which an area including a target image among the plurality of areas is set as the driving area.

13. The apparatus of claim 11, wherein the second mode is a mode that sets, among the plurality of areas, an area including the target image and four areas adjacent to upper, lower, left, and right sides of the area including the target image as the driving area.

14. The apparatus of claim 11, wherein the third mode is a mode that sets, among the plurality of areas, an area including the target image, four areas adjacent to upper, lower, left, and right sides of the area including the target image, and four areas diagonally adjacent to the area including the target image as the driving area.

15. The apparatus of claim 11, wherein the fourth mode is a mode in which all of the plurality of areas are set as the driving area.

16. The apparatus of claim 11, wherein the first mode is selected after sunset and before sunrise.

17. The apparatus of claim 11, wherein the first mode is selected after sunrise and before sunset, and an illuminance is less than a first threshold value based on the illuminance information.

18. The apparatus of claim 11, wherein the second mode is selected after sunrise and before sunset and an illuminance is equal to or greater than a first threshold value and less than a second threshold value, based on the illuminance information.

* * * * *